March 28, 1950 P. R. MOSS 2,502,268
APPARATUS FOR GROOVING ROLLS
Filed April 23, 1946 3 Sheets-Sheet 1
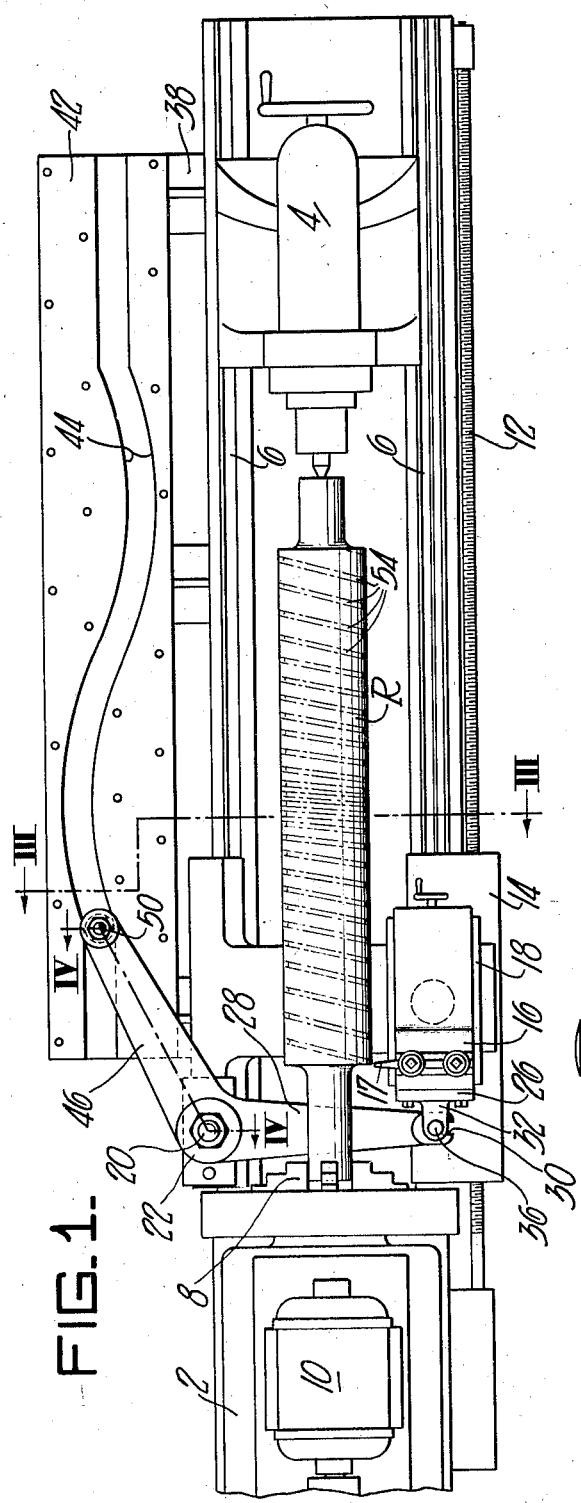
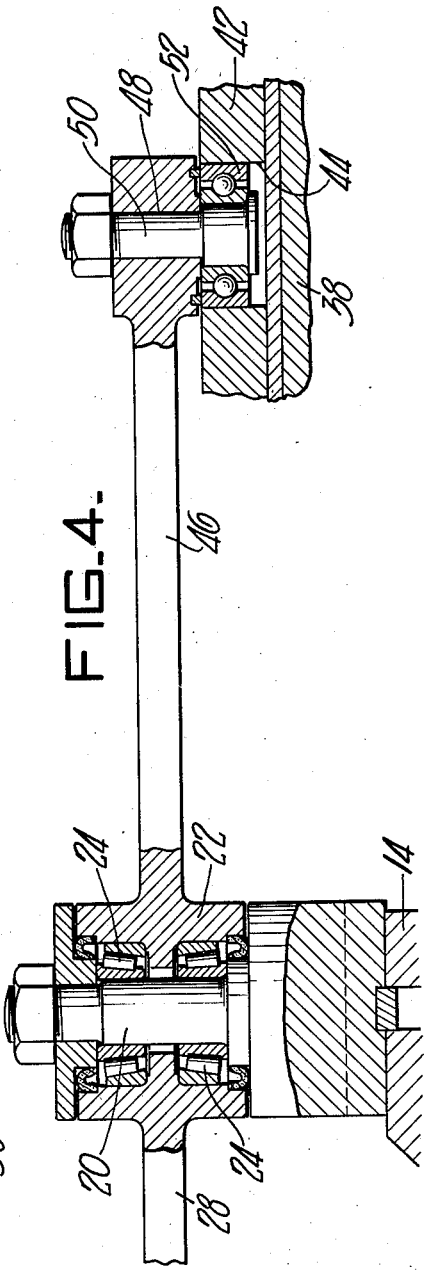
INVENTOR:
PERCY R. MOSS,
BY:
Donald G. Dalton
HIS ATTORNEY

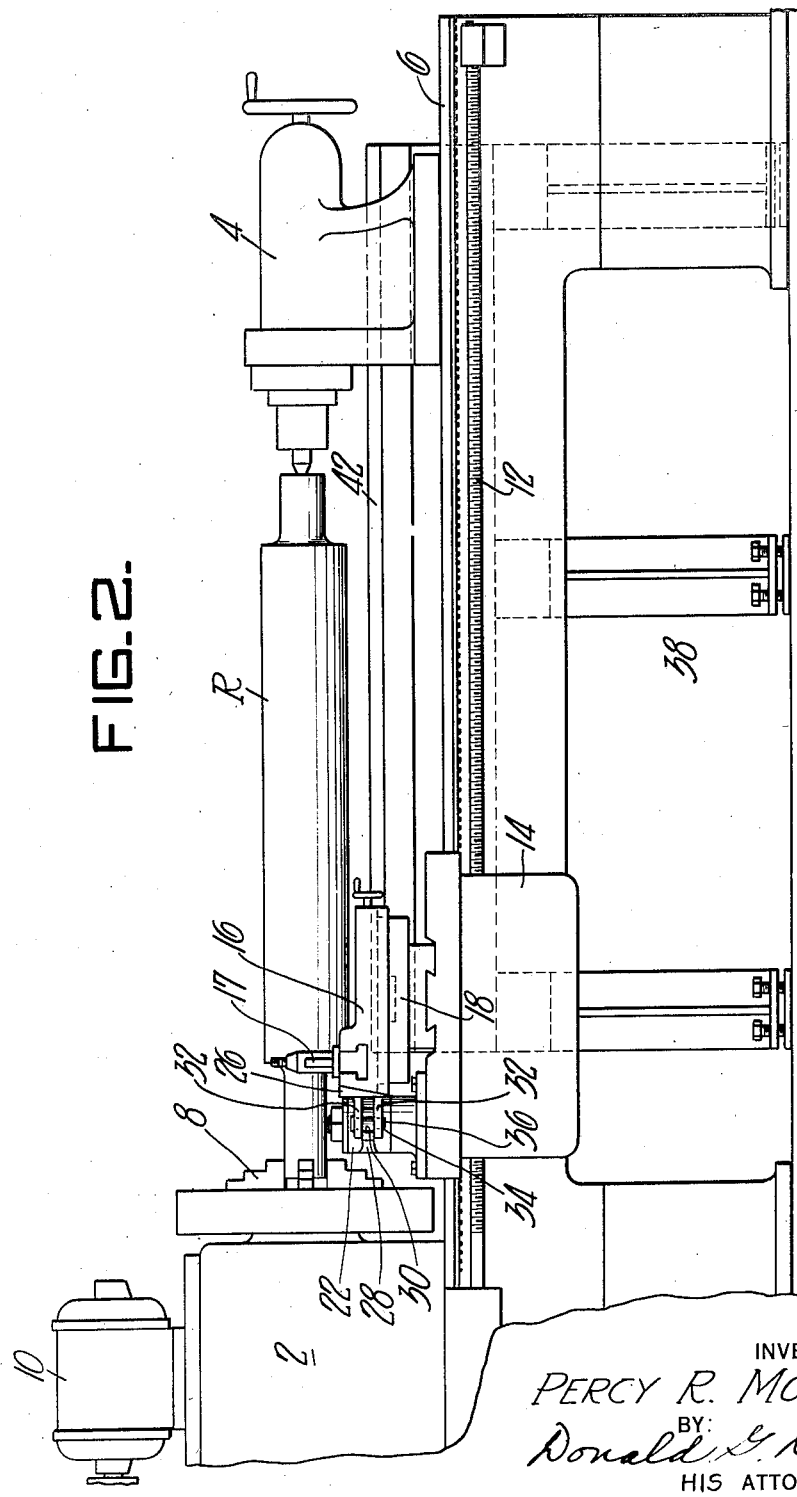

March 28, 1950  P. R. MOSS  2,502,268
APPARATUS FOR GROOVING ROLLS
Filed April 23, 1946  3 Sheets-Sheet 3

INVENTOR:
PERCY R. MOSS.
BY: Donald G. Dalton
HIS ATTORNEY.

Patented Mar. 28, 1950

2,502,268

UNITED STATES PATENT OFFICE 2,502,268

APPARATUS FOR GROOVING ROLLS

Percy R. Moss, Birmingham, Ala., assignor to Tennessee Coal, Iron and Railroad Company, a corporation of Alabama Application April 23, 1946, Serial No. 664,293

2 Claims. (Cl. 82—14)

This invention relates to apparatus for grooving rolls and more particularly to a lathe attachment for putting a variable pitch spiral groove in the exit rolls of galvanizing machines. The purpose of the groove is to spread the spelter over the surfaces of the sheet being galvanized as it emerges from the galvanizing machine. The exit rolls previously used were grooved with a constant pitch spiral extending the full length of the roll. With this type of groove an uneven distribution of the spelter on the sheet surface was obtained, the spelter being extra heavy on the edges of the sheets, thus causing flaking when the sheets were subsequently processed. This constant pitch spiral groove was made by turning the roll on a conventional type lathe. I have found that by using a variable pitch spiral groove, a better spelter distribution is obtained. It was impractical to produce this variable pitch spiral on a conventional lathe and, therefore, it was necessary to devise ways and means for producing such a spiral.

It is an object of my invention to provide a lathe attachment for producing a variable pitch spiral groove in rolls.

This and other objects will be more apparent after referring to the following specification and attached drawings, in which:

Figure 1 is a plan view of a roll in place in the lathe of my invention;

Figure 2 is a front elevation of the lathe;

Figure 4 is a sectional view taken on the line IV—IV of Figure 1.

Figure 3:
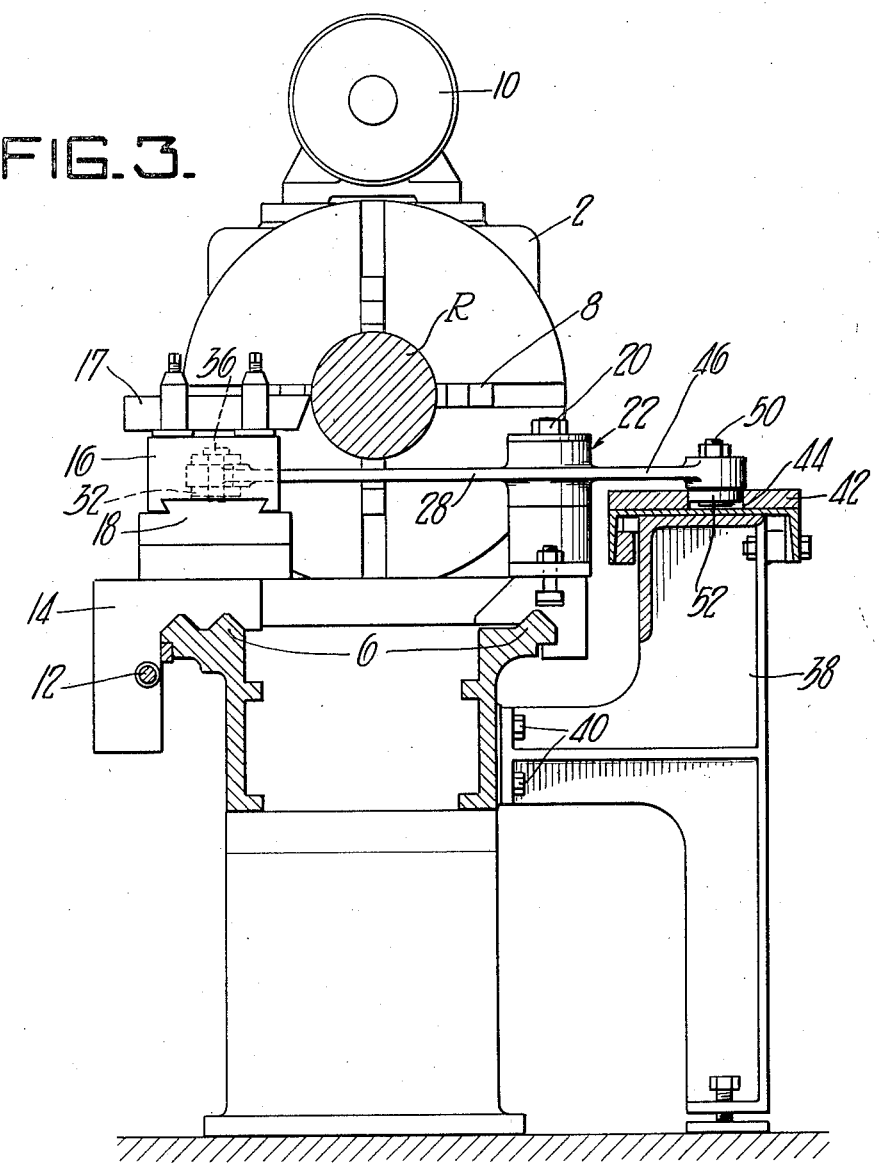
Figure 3 is a sectional view taken on the line III—III of Figure 1.

Referring more particularly to the drawings, the reference numeral 2 indicates the headstock of a conventional lathe and the reference numeral 4 indicates the tailstock which is mounted for movement toward the headstock on the guides 6. The roll R to be grooved is rotatably mounted between the headstock 2 and the tailstock 4, the chuck 8 of the headstock being rotated by the motor 10, to revolve the roll R. The lead screw 12, having its axis parallel to the roll axis, is also driven from the motor 10. The lathe carriage 14 is mounted on the guides 6 and is moved therealong when engaged with the lead screw 12. The foregoing is all in accordance with the usual practice. A tool rest 16 which supports a grooving tool 17 is slidably mounted on the guides 18 of the carriage 14 for movement parallel to the roll axis. The tool rest 16 may be of conventional construction with its feed screw removed to allow sliding motion with respect to the carriage 14. A fulcrum pin 20 is mounted on the carriage 14 on the side of the roll R opposite the tool rest 16. A bell crank lever 22 is mounted for pivotal movement on anti-friction bearings 24 which are supported by the pin 20 as shown in Figure 4. A bracket 26 is attached to the tool rest 16 in any suitable manner. The arm 28 of the bell crank lever 22 is provided with a slot 30 at its outer end which is adjacent spaced apart lugs 32 in the bracket 26. The arm 28 extends between the lugs 32 which have aligned openings 34 therein. The pin 36 passes through the aligned openings 34 and the slot 30. A bracket 38 is fastened to the lathe on the side opposite the lead screw 12 by means of screws 40. Mounted on the bracket 38 is a cam 42 having a cam groove 44 therein. The second arm 46 of the bell crank lever 22 has an opening 48 at its outer end for receiving a bolt 50 which supports the cam follower 52 in the cam groove 44.

The operation of the device is as follows:

The roll R is placed in the lathe and the motor 10 started up to rotate the roll. The carriage 14 is engaged with the lead screw 12, this causing the carriage to be moved parallel to the roll R. As the carriage moves, the tool 17 engages the roll R and cuts the groove 54 therein. The pitch of the groove is varied as follows:

As the carriage 14 advances, the cam follower 52 follows the cam track 44 causing the bell crank lever 22 to swing about the pivot pin 20. This causes the tool rest 16 to advance a predetermined amount on the carriage 14 for each revolution of the roll up to the center of the roll. The cam track 44 is so shaped that when the tool 17 reaches the center of the roll, the movement of the carriage 14 and the tool rest 16 are the same. After passing the center of the roll, the movement of the tool rest 16 is retarded by the cam action the same amount that it was advanced up to the center line of the roll. In other words, the pitch of the groove 54 gradually decreases in the same manner from each end of the roll to the center thereof. This attachment can also be used for making auxiliary lead screws for lathes or for cutting cam grooves in a rotary member.

While one embodiment of my invention has been shown and described, it will be apparent that other adaptations and modifications may be made without departing from the scope of the following claims.

I claim:

1. In a machine for grooving the periphery of a roll or the like, the combination including a bed, means on said bed for rotatably mounting said roll, a carriage slidable on said bed, means for moving said carriage parallel to the axis of said roll, a tool rest mounted on said carriage for movement with respect thereto parallel to the axis of said roll, a tool mounted on said rest, a bell crank pivotally mounted on said carriage, a cam track mounted on said bed, means for connecting one arm of said crank to the tool rest, and a cam follower mounted on the other arm of said crank and engaging said cam track, said cam follower following said cam track during movement of said carriage to move said tool rest with respect to said carriage.

2. In a machine for grooving the periphery of a roll or the like, the combination including a bed, means on said bed for rotatably mounting said roll, a carriage slidable on said bed, means for moving said carriage parallel to the axis of said roll, a tool rest mounted on said carriage for movement with respect thereto parallel to the axis of said roll, a tool mounted on said rest, means pivotally mounted on said carriage, a pattern mounted on said bed, means for connecting one end of said third named means to the tool rest, and a follower mounted on the other end of said third named means and scanning said pattern, said follower scanning said pattern during movement of said carriage to move said tool rest with respect to said carriage.

PERCY R. MOSS.

REFERENCES CITED

The following references are of record in the file of this patent:

UNITED STATES PATENTS

| Number | Name | Date |
|---|---|---|
| 1,195,293 | Townsend | Aug. 22, 1916 |
| 1,230,647 | Aurich | June 19, 1917 |
| 1,374,378 | Johnson | Apr. 12, 1921 |
| 1,571,745 | Warner | Feb. 2, 1926 |
| 1,630,716 | Pierce | May 31, 1927 |
| 1,982,983 | Czemba | Dec. 4, 1934 |
| 2,069,508 | Rutemiller et al. | Feb. 2, 1937 |
| 2,354,372 | Groene et al. | July 25, 1944 |
| 2,407,778 | Groene et al. | Sept. 17, 1946 |

FOREIGN PATENTS

| Number | Country | Date |
|---|---|---|
| 4,000 | Great Britain | 1874 |